US011806925B2

(12) United States Patent
Gold et al.

(10) Patent No.: US 11,806,925 B2
(45) Date of Patent: Nov. 7, 2023

(54) ADDITIVE MANUFACTURING PROCESS

(71) Applicant: General Electric Company, Schenectady, NY (US)

(72) Inventors: Scott Alan Gold, Waynesville, OH (US); Thomas Graham Spears, Springdale, OH (US); Ajay Kumar Anand, Oakland, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/069,544

(22) Filed: Dec. 21, 2022

(65) Prior Publication Data

US 2023/0129572 A1    Apr. 27, 2023

Related U.S. Application Data

(62) Division of application No. 16/662,621, filed on Oct. 24, 2019, now Pat. No. 11,559,854.

(Continued)

(51) Int. Cl.
*B29C 64/153*    (2017.01)
*B33Y 10/00*    (2015.01)
(Continued)

(52) U.S. Cl.
CPC ............ *B29C 64/153* (2017.08); *B22F 10/28* (2021.01); *B23K 26/032* (2013.01);
(Continued)

(58) Field of Classification Search
CPC .. B23K 26/342; B23K 26/702; B23K 26/032; B23K 26/034; B23K 26/1464;
(Continued)

(56) References Cited

U.S. PATENT DOCUMENTS

| 8,723,078 | B2 | 5/2014 | Mazumder et al. |
| 9,355,441 | B2 | 5/2016 | Wersborg et al. |

(Continued)

FOREIGN PATENT DOCUMENTS

| CN | 101576000 A | 11/2009 |
| CN | 101642848 A | 2/2010 |

(Continued)

OTHER PUBLICATIONS

Second Office Action in China Patent Application No. 201911086694.4 dated Feb. 14, 2021.
(Continued)

*Primary Examiner* — Phuong T Nguyen
(74) *Attorney, Agent, or Firm* — Dinsmore & Shohl LLP (57) ABSTRACT

A system and method of monitoring a powder-bed additive manufacturing process is provided where a layer of additive powder is fused using an energy source and electromagnetic emission signals are measured by a melt pool monitoring system to monitor the print process. The measured emission signals are analyzed to identify outlier emissions and clusters of outliers are identified by assessing the spatial proximity of the outlier emissions, e.g., using clustering algorithms, spatial control charts, etc. An alert may be provided or a process adjustment may be made when a cluster is identified or when a magnitude of a cluster exceeds a predetermined cluster threshold.

9 Claims, 5 Drawing Sheets

Related U.S. Application Data (60) Provisional application No. 62/757,849, filed on Nov. 9, 2018.

(51) Int. Cl.

| | | |
|---|---|---|
| *B33Y 30/00* | (2015.01) | |
| *B33Y 50/02* | (2015.01) | |
| *B23K 26/342* | (2014.01) | |
| *B23K 26/70* | (2014.01) | |
| *B23K 26/03* | (2006.01) | |
| *B23K 26/14* | (2014.01) | |
| *B23K 31/00* | (2006.01) | |
| *B22F 10/28* | (2021.01) | |
| *B22F 12/49* | (2021.01) | |
| *B22F 12/60* | (2021.01) | |
| *B22F 12/90* | (2021.01) | |
| *B22F 10/322* | (2021.01) | |
| *B22F 10/368* | (2021.01) | |

(52) U.S. Cl.
CPC ........ *B23K 26/034* (2013.01); *B23K 26/1464* (2013.01); *B23K 26/342* (2015.10); *B23K 26/702* (2015.10); *B23K 31/003* (2013.01); *B33Y 10/00* (2014.12); *B33Y 30/00* (2014.12); *B33Y 50/02* (2014.12); *B22F 10/322* (2021.01); *B22F 10/368* (2021.01); *B22F 12/49* (2021.01); *B22F 12/60* (2021.01); *B22F 12/90* (2021.01)

(58) Field of Classification Search
CPC .... B23K 26/003; B23K 26/082; B23K 26/12; B23K 26/03; B23K 26/0604; B23K 31/125; B33Y 10/00; B33Y 30/00; B33Y 50/02; G01K 11/00; B41M 5/262
USPC .......... 219/76.1, 76.14, 74, 121.64, 75, 130; 376/287; 427/507, 517
See application file for complete search history.

(56) References Cited

U.S. PATENT DOCUMENTS

| | | |
|---|---|---|
| 10,048,661 B2 | 8/2018 | Arthur et al. |
| 10,265,912 B2 | 4/2019 | Herzog et al. |
| 10,372,117 B2* | 8/2019 | Willett .................. G06T 7/0004 |
| 10,520,427 B2 | 12/2019 | Hess et al. |
| 2015/0321422 A1 | 11/2015 | Boyer |
| 2015/0367453 A1 | 12/2015 | Herzog |
| 2017/0144223 A1 | 5/2017 | Gold et al. |
| 2017/0246810 A1 | 8/2017 | Gold |
| 2017/0266762 A1 | 9/2017 | Dave et al. |
| 2018/0154484 A1 | 6/2018 | Hall |
| 2021/0162508 A1 | 6/2021 | Narita et al. |

FOREIGN PATENT DOCUMENTS

| | | |
|---|---|---|
| CN | 106077647 A | 11/2016 |
| DE | 202010010771 U1 | 11/2011 |
| EP | 3210697 A1 | 8/2017 |
| WO | 2017085468 A1 | 5/2017 |

OTHER PUBLICATIONS

First Office Action in China Patent Application No. 201911086694.4 dated Jul. 30, 2021.
European Patent Application No. 19206562.1-1103 Office Action dated Jan. 21, 2021.
Japanese Patent Application No. 2019-202892 Notice of Reasons for Refusal dated Feb. 16, 2021.
Extended European Search Report for application EP 19206562.1 dated Jan. 7, 2020 (7 pages).
"Machine Learning—An Experimental comparison of model-based clustering methods", Authors: Marina Melia and David Heckerman, published by Kluwer Academic Publisher in 2001 (Year: 2001).
"A Unified Appraoch to Detecting Spatial Outliers" written by Shashi Shekhar, Chang-Tien Lu and Pusheng Zhang, published by Kluwer Academic Publishers (Year: 2003).
"A scoping review of spatial cluster analysis techniques for point-vent data" written by Charles Eagle Fritz, Nadine Schuurman and Colin Robertson, published by Geospatial health (Year: 2013).

* cited by examiner

ADDITIVE MANUFACTURING PROCESS

PRIORITY INFORMATION

The present applicant is a divisional of U.S. patent application Ser. No. 16/662,621 filed on Oct. 24, 2019, which claims priority to U.S. Provisional Patent Application Ser. No. 62/757,849 filed on Nov. 9, 2018, which are both titled "Melt Pool Monitoring System and Method for Detecting Errors in an Additive Manufacturing Process", the disclosures of which are both incorporated by reference herein in their entireties.

FIELD

The present disclosure generally relates to additive manufacturing machines, or more particularly, to error detection systems and methods for an additive manufacturing machine.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and/or ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass, and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress relief process. Additionally, thermal, mechanical, and chemical post processing procedures can be used to finish the part.

In order to monitor the additive manufacturing process, certain conventional additive manufacturing machines include melt pool monitoring systems. These monitoring systems typically include one or more cameras or light sensors for detecting light that is radiated or otherwise emitted from the melt pool generated by the energy beam. The camera or sensor values can be used to evaluate the quality of the build after completion of the build process. The quality evaluation may be used to adjust the build process, stop the build process, troubleshoot build process anomalies, issue a warning to the machine operator, and/or identify suspect or poor quality parts resulting from the build. However, most melt pool monitoring systems perform data analysis after a build is completed or are otherwise complex and delayed in identifying process issues. Moreover, such melt pool monitoring systems are frequently not effective at identifying process faults that result in quality issues in finished parts, scrapped parts, increased material costs, and excessive machine downtime.

Accordingly, an additive manufacturing machine with improved error detection systems would be useful. More particularly, a system and method for utilizing a melt pool monitoring system to quickly and effectively detect process issues during operation of an additive manufacturing machine would be particularly beneficial.

BRIEF DESCRIPTION

Aspects and advantages will be set forth in part in the following description, or may be obvious from the description, or may be learned through practice of the invention.

According to one embodiment of the present subject matter, a method of monitoring a powder-bed additive manufacturing process is provided. The method includes irradiating a layer of powder on a powder bed of an additive manufacturing machine, measuring emission signals from the powder bed while irradiating the layer of powder, and identifying outlier emissions where the measured emission signals exceed a predetermined signal threshold. The method further includes identifying outlier clusters by assessing the spatial proximity of the outlier emissions, and generating an alert in response to identifying the outlier clusters.

According to another exemplary embodiment, an additive manufacturing machine is provided including a powder depositing apparatus for depositing a layer of additive material on a powder bed, an irradiation device for selectively fusing a portion of the layer of additive material to form a cross sectional layer of a part, and a melt pool monitoring system for measuring emission signals from the powder bed while the irradiation device is fusing the cross sectional layer. A controller is operably coupled to the melt pool monitoring system for identifying outlier emissions where the measured emission signals exceed a predetermined signal threshold, identifying outlier clusters by assessing the spatial proximity of the outlier emissions, and generating an alert in response to identifying the outlier clusters.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, as used herein, terms of approximation, such as "approximately," "substantially," or "about," refer to being within a ten percent margin of error.

The present subject matter is generally directed to a method for real time monitoring of a powder-bed additive manufacturing processes, e.g., such as a DMLM process. In this regard, during the printing of each layer of a part, a system controller may operate a melt pool monitoring system and implement a control algorithm to monitor melt pool characteristics, such as emission intensity, melt pool dimensions, spectral signature, etc.

The data stream recorded by the melt pool monitoring system may be analyzed for spatially localized extreme values. In general, a system controller may monitor the print process, including melt pool data, for each printed layer. The analysis may include scanning the melt pool data for extreme outliers and assessing the spatial proximity of those outliers. If clusters are identified (e.g., if the special clusters exceed an predetermined cluster density or other threshold), the controller may flag the layer for further analysis, stop the print process, make an adjustment to the print process, notify an operator, or make any other operating adjustment.

Specifically, the data stream may be analyzed using one or more clustering algorithms or methods, such as k-means clustering, k-medians clustering, density-based spatial clustering of applications with noise (DBSCAN), and ordering points to identify clustering structure (OPTICS), to identify clusters of extreme operating emissions or errors. If such a cluster is found, a warning may be issued to the operator. Alternative computational and sensor approaches to implementation of this algorithm and different monitoring systems may be used while remaining within the scope of the present subject matter. For example, according to still other embodiments, spatial control charts may be used to assess the spatial proximity of electromagnetic emissions that are not normal or are outlier emissions.

Thus, the system and methods described herein may be used to detect print errors or process faults and notify the operator accordingly. Alternatively, the additive manufacturing machine may be configured for making operating adjustments to correct or rectify such errors or printing issues. In this manner, process interruptions which may otherwise lead to scrapped parts, wasted material, lost time, and other unnecessary costs and delays may be avoided. Moreover, these issues may be detected in real time and addressed immediately, saving time and money as well as effectively increasing capacity. In addition, the present methods can be executed by a dedicated or system controller, may reduce computational requirements, may require minimal computer memory and processor resources, etc.

Figure 1:
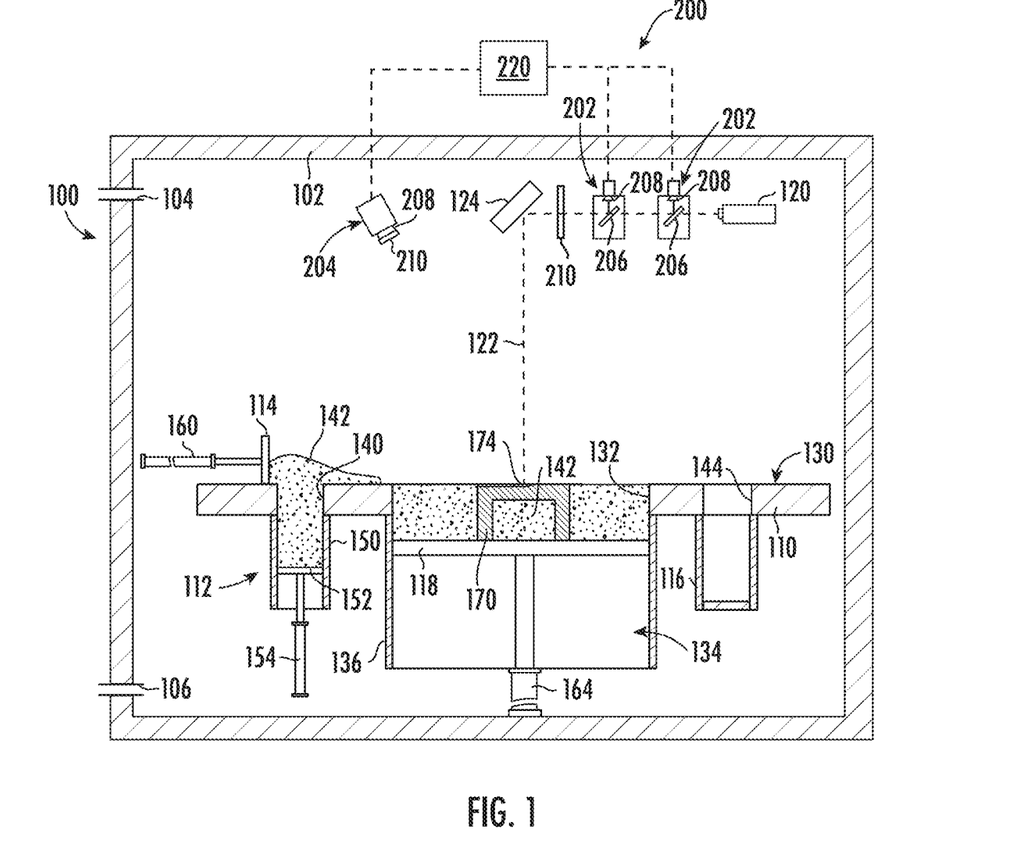
FIG. 1 shows a schematic view of an additive manufacturing machine according to an exemplary embodiment of the present subject matter.

Referring to FIG. 1, a laser powder bed fusion system, such as a DMLS or DMLM system 100 will be described according to an exemplary embodiment. As illustrated, system 100 includes a fixed enclosure 102 which provides a contaminant-free and controlled environment for performing an additive manufacturing process. In this regard, for example, enclosure 102 serves to isolate and protect the other components of the system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an exemplary embodiment, AM system 100 generally includes a table 110, a powder supply 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the AM process as described in more detail below. Each of these components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. In addition, build surface 130 defines a supply opening 140 through which additive powder 142 may be supplied from powder supply 112 and a reservoir opening 144 through which excess additive powder 142 may pass into overflow reservoir 116. Collected additive powders may optionally be treated to sieve out loose, agglomerated particles before re-use.

Powder supply 112 generally includes an additive powder supply container 150 which generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 which is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

Energy source 120 may include any known device operable to generate a beam of suitable power and other operating characteristics to melt and fuse the metallic powder during the build process. For example, energy source 120 may be a laser or any other suitable irradiation emission directing device or irradiation device. Other directed-energy sources such as electron beam guns are suitable alternatives to a laser.

According to an exemplary embodiment, beam steering apparatus 124 includes one or more mirrors, prisms, lenses, and/or electromagnets operably coupled with suitable actuators and arranged to direct and focus energy beam 122. In this regard, for example, beam steering apparatus 124 may be a galvanometer scanner that moves or scans the focal point of the laser beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. It should be appreciated that other types of energy sources 120 may be used which may use and alternative beam steering apparatus 124. For example, if the energy source 120 is an electronic control unit for directing an electron beam, beam steering apparatus 124 may be, e.g. a deflecting coil.

Prior to an additive manufacturing process, supply recoater 160 may be lowered to provide a supply of powder 142 of a desired composition (for example, metallic, ceramic, and/or organic powder) into supply container 150. In addition, platform actuator 164 may move build platform 118 to an initial high position, e.g., such that it substantially flush or coplanar with build surface 130. Build platform 118 is then lowered below build surface 130 by a selected layer increment. The layer increment affects the speed of the additive manufacturing process and the resolution of a components or parts 170 being manufactured. As an example, the layer increment may be about 10 to 100 micrometers (0.0004 to 0.004 in.).

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 1). Subsequently, recoater mechanism 114 may be moved back to a starting position.

Therefore, as explained herein and illustrated in FIG. 1, recoater mechanism 114, recoater actuator 160, supply platform 152, and supply actuator 154 may generally operate to successively deposit layers of additive powder 142 or other additive material to facilitate the print process. As such, these components may collectively be referred to herein as powder depositing apparatus, system, or assembly. The leveled additive powder 142 may be referred to as a "build layer" 172 (see FIG. 2) and the exposed upper surface thereof may be referred to as build surface 130. When build platform 118 is lowered into build chamber 134 during a build process, build chamber 134 and build platform 118 collectively surround and support a mass of additive powder 142 along with any components 170 being built. This mass of powder is generally referred to as a "powder bed", and this specific category of additive manufacturing process may be referred to as a "powder bed process."

During the additive manufacturing process, the directed energy source 120 is used to melt a two-dimensional cross-section or layer of the component 170 being built. More specifically, energy beam 122 is emitted from energy source 120 and beam steering apparatus 124 is used to steer the focal point 174 of energy beam 122 over the exposed powder surface in an appropriate pattern. A small portion of exposed layer of the additive powder 142 surrounding focal point 174, referred to herein as a "weld pool" or "melt pool"

or "heat effected zone" 176 (best seen in FIG. 2) is heated by energy beam 122 to a temperature allowing it to sinter or melt, flow, and consolidate. As an example, melt pool 176 may be on the order of 100 micrometers (0.004 in.) wide. This step may be referred to as fusing additive powder 142.

Figure 2:
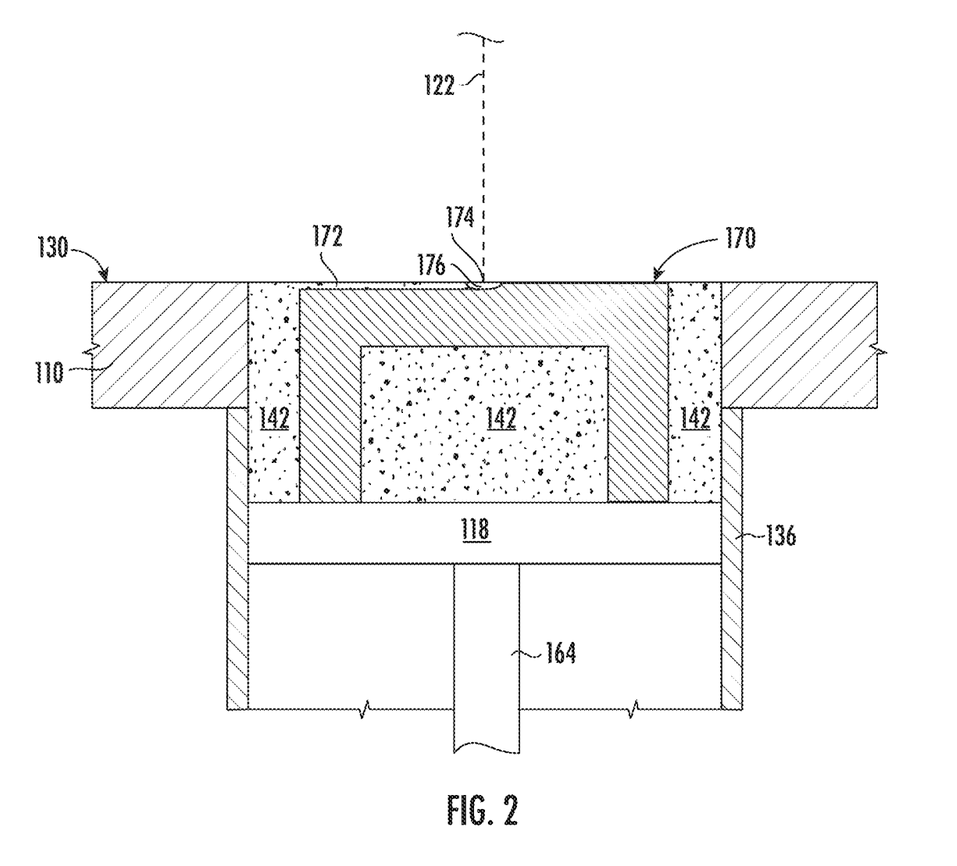
FIG. 2 shows a close-up schematic view of a build platform of the exemplary additive manufacturing machine of FIG. 1 according to an exemplary embodiment of the present subject matter.

Build platform 118 is moved vertically downward by the layer increment, and another layer of additive powder 142 is applied in a similar thickness. The directed energy source 120 again emits energy beam 122 and beam steering apparatus 124 is used to steer the focal point 174 of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-solidified layer. This cycle of moving build platform 118, applying additive powder 142, and then directed energy beam 122 to melt additive powder 142 is repeated until the entire component 170 is complete.

As explained briefly above, as energy source 120 and beam steering apparatus 124 direct energy beam 122, e.g., a laser beam or electron beam, onto the powder bed or build surface 130, the additive powders 142 are heated and begin to melt into melt pool 176 where they may fused to form the final component 170. Notably, the heated material emits electromagnetic energy in the form of visible and invisible light. A portion of the directed energy beam is reflected back into the galvanometer scanner or beam steering apparatus 124 and a portion is generally scattered in all other directions within enclosure 102. Generally speaking, monitoring the emitted and/or reflected electromagnetic energy may be used to improve process monitoring and control. An exemplary system for monitoring the additive manufacturing process, e.g., using melt pool monitoring system 200 to detect process faults or build errors are described below according to exemplary embodiments.

Referring still to FIG. 1, a melt pool monitoring system 200 which may be used with system 100 for monitoring melt pool 176 and the manufacturing process in general will be described according to an exemplary embodiment of the present subject matter. Melt pool monitoring system 200 includes one or more electromagnetic energy sensors, e.g., such as light sensors, for measuring the amount of visible or invisible electromagnetic energy emitted from or reflected by melt pool 176. In this regard, "electromagnetic energy," "emissions," or the like may be used herein to refer to one or more of light or emission intensity, photodiode voltage response, pyrometer voltages or current response, light emission geometric dimensions, spectral response, area or wavelength of emissions, sensor noise response, or any other suitable measurable quantity or quality of electromagnetic energy.

According to the illustrated embodiment, melt pool monitoring system 200 includes two on-axis light sensors 202 and one fixed, off-axis light sensor 204. Each of these sensors 202, 204 will be described below according to an exemplary embodiment. However, it should be appreciated that melt pool monitoring system 200 may include any other suitable type, number, and configuration of sensors for detecting electromagnetic energy and other properties of melt pool 176 or the process in general.

As used herein, "beamline" or "on-axis" light sensors 202 refer to sensors which generally are positioned along the path of energy beam 122. These sensors may monitor emitted and/or reflected light returning along the beam path. Specifically, as energy beam 122 forms melt pool 176, a portion of the emitted and reflected electromagnetic energy from melt pool 176 returns to energy source 120 along the same path. An on-axis sensor 202 may include a beam splitter 206 positioned along the beamline which may include a coating for redirecting a portion of the electromagnetic energy toward a beamline sensing element 208. In this regard, for example, sensing element 208 may be a photodiode, a pyrometer, an optical camera, an infrared (IR) camera, a photomultiplier tube, or a spectrometer or other spectral sensor configured for measuring electromagnetic energy in any frequency spectrum(s), such as infrared (IR), ultraviolet (UV), visible light, etc. On-axis sensor 202 can measure any suitable parameter of the filtered, reflected beam, such as intensity, frequency, wavelength, etc.

In addition, as used herein, "fixed" or "off-axis" light sensors 204 refer to sensors which generally have a fixed position relative to melt pool 176 and are used to measure electromagnetic energy generated by energy beam 122 and melt pool 176 within a specified field of view. In addition, fixed light sensors 204 may include any suitable device, such as, e.g., a photodiode or infrared (IR) camera. Off-axis light sensors 204 may operate in a manner similar to on-axis light sensors 202, but are not located on the beamline and include a sensing element 208 that is generally configured for monitoring scattered electromagnetic energy from the melt pool 176.

According to exemplary embodiments of the present subject matter, melt pool monitoring system 200 may further include one or more filters 210 for filtering electromagnetic energy before it reaches sensing elements 208 of respective sensors 202, 204. For example, filter 210 may remove the wavelength of energy beam 122, such that sensors 202, 204 monitor only reflected electromagnetic energy. Alternatively, filters 210 may be configured for removing other unwanted wavelengths for improved monitoring of melt pool 176 or the process in general.

Melt pool monitoring system 200 further includes a controller 220 which is operably coupled with on-axis light sensor 202 and/or off-axis light sensor 204 for receiving signals corresponding to the detected electromagnetic energy. Controller 220 may be a dedicated controller for melt pool monitoring system 200 or may be system controller for operating AM system 100. Controller 220 may include one or more memory devices and one or more microprocessors, such as general or special purpose microprocessors operable to execute programming instructions or micro-control code associated with an additive manufacturing process or process monitoring. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 220 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

It should be appreciated that AM system 100 and melt pool monitoring system 200 are illustrated and described herein only for explaining aspects of the present subject matter. However, the scope of the present subject matter is not limited to such exemplary embodiments, but is instead contemplated as including embodiments including variations and modifications. For example, melt pool monitoring system 200 may include different configurations and sensor types, AM system 100 may include alternative or additional features, and other variations may be applied according to alternative embodiments. In addition, other suitable forms and/or types of powder supply 112 may be used, such as a powder container that moves along build surface 130 while depositing additive powder at a predetermined flow rate. Furthermore, any suitable configuration of beam steering apparatus 124 may be used, e.g., based on the type of energy beam 122 generated. Other configurations are possible and within the scope of the present subject matter.

Figure 3:
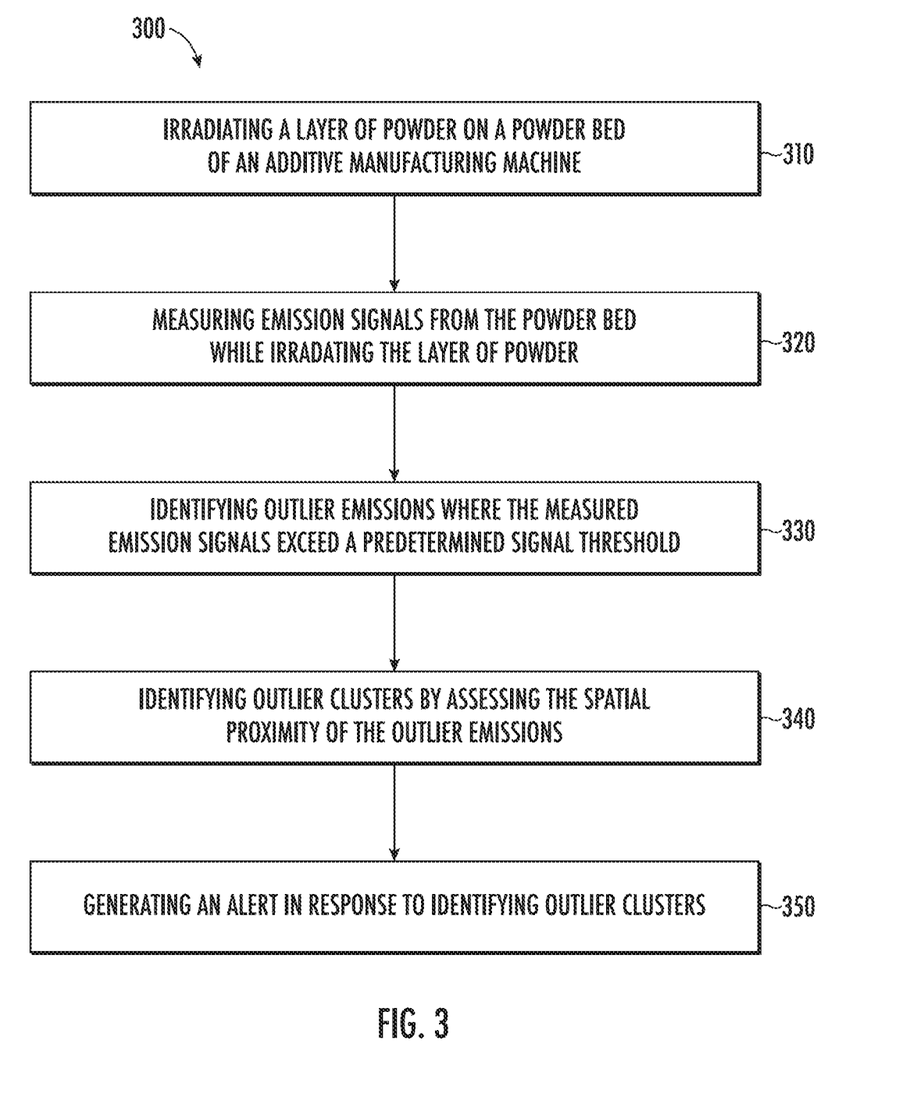
FIG. 3 is a method of monitoring a powder-bed additive manufacturing process for process faults in accordance with one embodiment of the present disclosure.

Now that the construction and configuration of AM system 100 and melt pool monitoring system 200 have been described according to exemplary embodiments of the present subject matter, an exemplary method 300 for monitoring an additive manufacturing process will be described according to an exemplary embodiment of the present subject matter. Method 300 can be used to monitor the operation of AM system 100 using melt pool monitoring system 200, or may be used to monitor any other suitable additive manufacturing machine using any other suitable sensor systems. In this regard, for example, controller 220 may be configured for implementing some or all steps of method 300. Further, it should be appreciated that the exemplary method 300 is discussed herein only to describe exemplary aspects of the present subject matter, and is not intended to be limiting.

Referring now to FIG. 3, method 300 includes, at step 310, irradiating a layer of powder on a powder bed of an additive manufacturing machine. In this regard, for example, energy source 120 may direct energy beam 122 to focal point 174 on build layer 172 of a powder bed, e.g., build surface 130. In this manner, additive powder 142 or other materials may be selectively melted, sintered, or otherwise fused to form a portion of component 170. As explained above, this process of irradiating additive powder may emit electromagnetic emissions and other sintering/melting byproducts that may be used to monitor the additive manufacturing process.

Step 320 generally includes measuring emission signals from the powder bed while irradiating the layer of powder. In this regard, for example, melt pool monitoring system 200 may generally monitor electromagnetic emissions from the powder bed as it is being selectively fused, e.g., as described above. Thus, during the printing process, melt pool monitoring system 200 may generally obtain data indicative of melt pool emissions in any suitable format which may be further assessed or analyzed to monitor the print process and make determinations related to desirable process adjustments.

Figure 4:
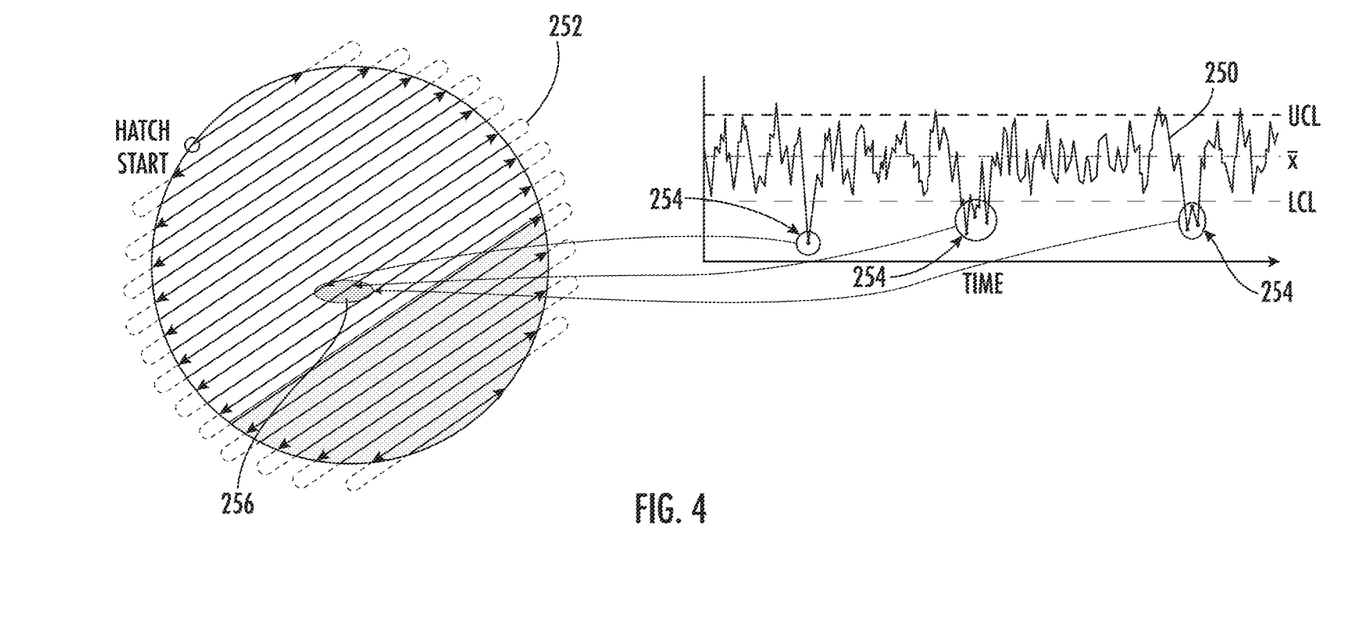
FIG. 4 shows exemplary data output of a melt pool monitoring system that may be used to detect process errors in the operation of the exemplary additive manufacturing machine of FIG. 1 according to an exemplary embodiment.

For example, referring briefly to FIG. 4, an exemplary print process for a layer of a component is illustrated along with the time-series representation of the electromagnetic emission signals measured and/or recorded by melt pool monitoring system 200. This data series may be referred to herein as "measured emissions," "raw emission data," or the like, and may be identified by reference numeral 250. In this regard, for example, on axis light sensor 202 may track focal point 174 as energy beam 122 moves along a commanded tool path (e.g. has identified by reference numeral 252 in FIG. 4) while measuring electromagnetic emissions 250.

For a normal process, random variation in the measured electromagnetic emission signal 250 is normal and expected. However, when the measured emissions 250 exceed upper control limits (e.g. as identified as UCL in FIG. 4) or fall below lower control limits (e.g., as identified by LCL in FIG. 4), these measured emissions may be considered out of the norm or "outlier emissions" and are identified by reference numeral 254. Thus, method 300 may further include, at step 330, identifying outlier emissions where the measured emission signals exceed a predetermined signal threshold (or otherwise fall outside predetermined boundaries). For example, as illustrated, the predetermined signal threshold may be identified as the upper and lower control limits (UCL and LCL), which may generally be approximately three standard deviations for a normal distribution. Alternatively, the predetermined signal threshold may be any other suitable limit determined in any other suitable manner.

Notably, because the measured emission signals 250 are typically represented in the time-series format (e.g., as shown in FIG. 4), it is frequently not evident when outlier emissions 254 within the measured emission signals 250 are located close to each other on a cross-sectional layer or within a three-dimensional region within component 170. While periodic variations may not be a serious problem and may require no intervention at all, outlier emissions which are clustered or in close spatial proximity may indicated print issue. For example, as shown in FIG. 4, many of the outlier emissions 254, while spaced apart on the time series plot, are actually all generated at a single hot spot 256 in the printed part. It is desirable to diagnose such issues and implement corrective action. In this regard, the present subject matter is generally directed to analyzing and assessing the spatial proximity of outlier emissions 254, e.g., to determine when process faults or errors have occurred and to initiate corrective action.

Step 340 includes identifying outlier clusters by assessing the spatial proximity of the outlier emissions within the measured emission signals. In this regard, step 340 is generally directed to identifying when outlier emissions are generated at or associated with a specific region or portion within the build area. For example, the spatial proximity may be defined in a two or three dimensional space and may incorporate both the additive powder 142 within powder bed as well as the component 170. According to an exemplary embodiment, the spatial proximity may be a density of outlier emissions 254 identified within a specific volume surrounding focal point 174. The density or spatial proximity may be defined in two dimensions (e.g., within a single build layer) or may be defined in three dimensions (e.g., through multiple build layers).

Spatial proximity of outlier emissions 254 may be determined in any suitable manner. For example, controller 220 may be configured for performing a clustering method or analyzing the measured emission signals 250 using a clustering algorithm. In this regard, the data stream of measured emission signals 250 may be analyzed using one or more clustering algorithms or methods, such as k-means clustering, k-medians clustering, density-based spatial clustering of applications with noise (DBSCAN), and ordering points to identify clustering structure (OPTICS), to identify clusters of extreme operating emissions or errors. Other clustering algorithms or statistical methods are possible and within the scope of the present subject matter.

Figure 5:
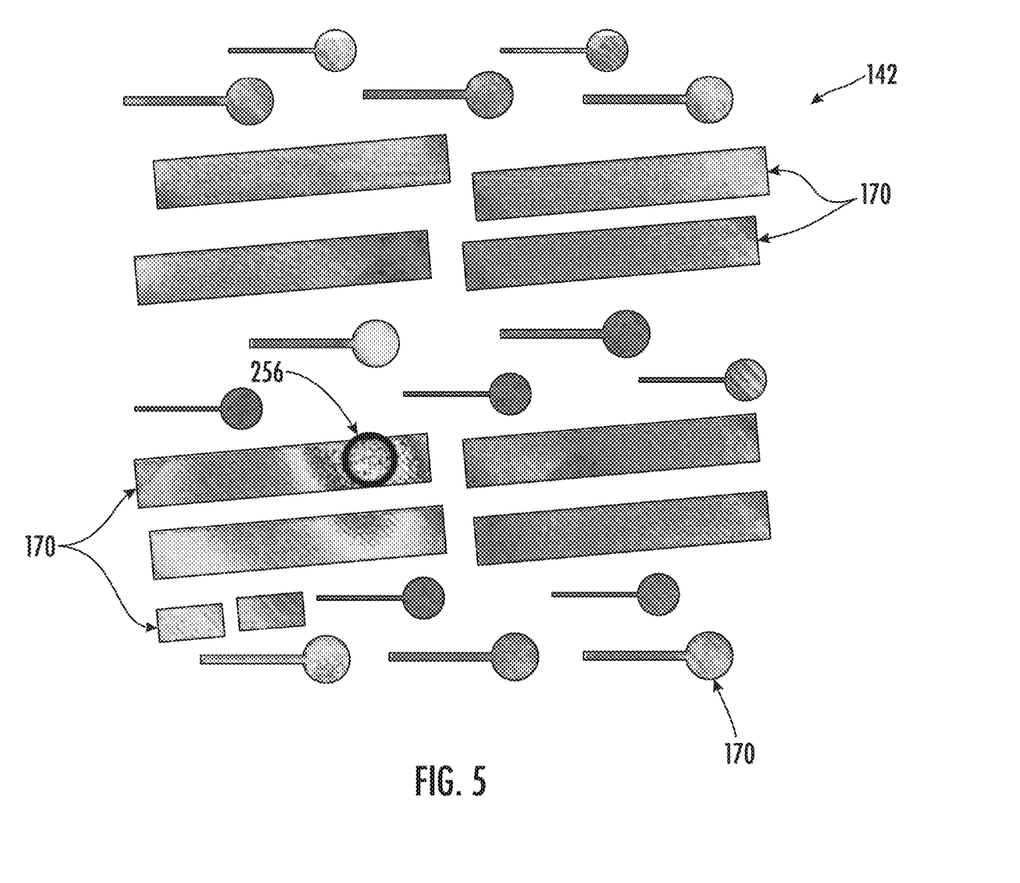
FIG. 5 shows an exemplary spatial control chart representing data obtained by a melt pool monitoring system that may be used to detect process errors in the operation of the exemplary additive manufacturing machine of FIG. 1 according to an exemplary embodiment.

According to alternative embodiments, spatial control charts may be used to identify clusters of outlier emissions 254 which indicate hotspots, process faults, or other issues in the additive printing process. For example, FIG. 5 illustrated a spatial control chart for an exemplary print process. In this regard, conventional time series data plot relevant process or quality metrics as a function of time in control charts (e.g. Shewhart charts, EWMA charts, etc.) to visually identify temporal drift or shifts in the metrics. Spatial control charts focus on the physical location associated with the data rather than temporal order.

One approach to spatial control charts is to utilize a variogram, semivariogram, or similar statistic chart which compares the variance, standard deviation, or covariance of the difference between values at different locations as a function of distance between the locations, in a moving average chart, or similar graphic. The variogram, semivariogram, or similar statistic outside threshold limits would be an indicator of a spatial cluster of extreme values. Alternatively, spatial weighting functions can be used in conjunction with multivariate projections methods such as principal component analysis, partial least squares regression to enable spatial clusters to be identified using multivariate statistical measures (e.g. Hotelling's T2 or Q statistics).

In another embodiment of a spatial control chart, melt pool monitoring system data can be treated as a multivariate image where 2 dimensions are the x and y coordinates associated with each layer of data divided into "pixel spaces" with each "pixel space" having corresponding measured melt pool characteristics (electromagnetic emission intensity, melt pool dimensions, etc.), the multivariate data set effectively unfolded using a projection method (i.e. principal component analysis or partial least squares), relevant score variables extracted and then reorganized into spatial arrays, and extreme values within the "pixel spaces" of the spatial arrays to identify spatial clusters associated with process anomalies.

Method 300 further includes, at step 350, generating an alert in response to identifying the outlier clusters. Thus, when clusters of outlier emissions 254 are identified in step 340, controller 220 may be configured for generating an alert, making a process change, or performing some other control action when the cluster is identified or when a magnitude of the cluster exceeds some cluster threshold. For example, the alert may be an audio or visual indication provided to an operator of the additive manufacturing machine. For example, the alert or indication may be displayed on a monitor for review of an operator (e.g., as a time-based plot, control chart, 3D indication or representation of compensated emission signal, etc.). Alternatively, the alert may be an email, text message, or other electronic message.

Alternatively, the alert may instead be an electronic signal to the machine controls that would stop or adjust a build parameter of the print process. In this regard, controller 220 may be programmed to automatically make the process adjustments to the additive manufacturing machine when a cluster is identified or exceeds a specific threshold. For example, controller 220 may be configured for adjusting an incidence angle of the energy source 120, the intensity of energy beam 122, the scan rate, the tool path, or any other process adjustment which will affect the printing of a cross-sectional layer or component 170 itself.

FIG. 3 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using AM system 100 and melt pool monitoring system 200 as an example, it should be appreciated that these methods may be applied to monitoring the operation of any suitable additive manufacturing machine.

Further aspects of the invention are provided by the subject matter of the following clauses:

1. A method of monitoring a powder-bed additive manufacturing process includes irradiating a layer of powder on a powder bed of an additive manufacturing machine, measuring emission signals from the powder bed while irradiating the layer of powder, identifying outlier emissions where the measured emission signals exceed a predetermined signal threshold, identifying outlier clusters by assessing the spatial proximity of the outlier emissions, and generating an alert in response to identifying the outlier clusters.

2. The method of any preceding clause, wherein the emission signals comprise electromagnetic energy emissions from a melt pool in the powder bed.

3. The method of any preceding clause, wherein the electromagnetic energy emissions comprise at least one of light intensity, photodiode voltage response, pyrometer voltages or current response, light emission geometric dimensions, spectral response, and sensor noise response.

4. The method of any preceding clause, wherein measuring the emission signals uses a melt pool monitoring system.

5. The method of any preceding clause, wherein the melt pool monitoring system comprises at least one of a photodiode, a pyrometer, a photomultiplier tube, an infrared camera, an optical camera, a spectrometer, and a spectral sensor.

6. The method of any preceding clause, wherein the melt pool monitoring system comprises at least one on-axis sensor.

7. The method of any preceding clause, wherein identifying the outlier clusters comprises: analyzing the measured emission signals using a clustering analysis method selected from k-means clustering, k-medians clustering, density-based spatial clustering of applications with noise (DB-SCAN), and ordering points to identify clustering structure (OPTICS).

8. The method of any preceding clause, further comprising: (a) depositing a layer of powder; (b) selectively fusing a portion of the layer of powder; and (c) repeating steps (a) and (b) to build a part layer-by-layer, wherein the steps of measuring emission signals, identifying outlier emissions, and identifying outlier clusters are performed with respect to at least two adjacent layers of the part.

9. The method of any preceding clause, wherein the steps of measuring emission signals, identifying outlier emissions, and identifying outlier clusters are performed in real time.

10. The method of any preceding clause, wherein generating the alert comprises: generating the alert when a cluster magnitude of the identified outlier clusters exceeds a cluster threshold.

11. The method of any preceding clause, wherein the alert is an audio or visual indication provided to an operator of the additive manufacturing machine.

12. An additive manufacturing machine comprising: a powder depositing apparatus for depositing a layer of additive material on a powder bed; an irradiation device for selectively fusing a portion of the layer of additive material to form a cross sectional layer of a part; a melt pool monitoring system for measuring emission signals from the powder bed while the irradiation device is fusing the cross sectional layer; and a controller operably coupled to the melt pool monitoring system, the controller being configured for: identifying outlier emissions where the measured emission signals exceed a predetermined signal threshold; identifying outlier clusters by assessing the spatial proximity of the outlier emissions; and generating an alert in response to identifying the outlier clusters.

13. The additive manufacturing machine of any preceding clause, wherein the emission signals comprise electromagnetic energy emissions from a melt pool in the powder bed.

14. The additive manufacturing machine of any preceding clause, wherein the electromagnetic energy emissions comprise at least one of light intensity, photodiode voltage response, pyrometer voltages or current response, light emission geometric dimensions, spectral response, and sensor noise response.

15. The additive manufacturing machine of any preceding clause, wherein the melt pool monitoring system comprises: at least one of a photodiode, a pyrometer, a photomultiplier tube, an infrared camera, an optical camera, a spectrometer, and a spectral sensor.

16. The additive manufacturing machine of any preceding clause, wherein the melt pool monitoring system comprises at least one on-axis sensor.

17. The additive manufacturing machine of any preceding clause, wherein identifying the outlier clusters comprises: analyzing the measured emission signals using a clustering analysis method selected from k-means clustering, k-medians clustering, density-based spatial clustering of applications with noise (DBSCAN), and ordering points to identify clustering structure (OPTICS).

18. The additive manufacturing machine of any preceding clause, wherein the additive manufacturing machine is configured for: (a) depositing a layer of powder; (b) selectively fusing a portion of the layer of powder; and (c) repeating steps (a) and (b) to build a part layer-by-layer, wherein the steps of measuring emission signals, identifying outlier emissions, and identifying outlier clusters are performed with respect to at least two adjacent layers of the part.

19. The additive manufacturing machine of any preceding clause, wherein the steps of measuring emission signals, identifying outlier emissions, and identifying outlier clusters are performed in real time.

20. The additive manufacturing machine of any preceding clause, wherein generating the alert comprises generating the alert when a cluster magnitude of the identified outlier clusters exceeds a cluster threshold, and wherein the alert is an audio or visual indication provided to an operator of the additive manufacturing machine.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine comprising:
a powder depositing apparatus for depositing a layer of additive material on a powder bed;
an irradiation device for selectively fusing a portion of the layer of additive material to form a cross sectional layer of a part;
a melt pool monitoring system for measuring emission signals from the powder bed while the irradiation device is fusing the cross sectional layer; and
a controller operably coupled to the melt pool monitoring system, the controller being configured for:
identifying outlier emissions where the measured emission signals exceed a predetermined signal threshold;
identifying outlier clusters by assessing the spatial proximity of the outlier emissions; and
generating an alert in response to identifying the outlier clusters.

2. The additive manufacturing machine of claim 1, wherein the emission signals comprise electromagnetic energy emissions from a melt pool in the powder bed.

3. The additive manufacturing machine of claim 2, wherein the electromagnetic energy emissions comprise at least one of light intensity, photodiode voltage response, pyrometer voltages or current response, light emission geometric dimensions, spectral response, and sensor noise response.

4. The additive manufacturing machine of claim 1, wherein the melt pool monitoring system comprises:
at least one of a photodiode, a pyrometer, a photomultiplier tube, an infrared camera, an optical camera, a spectrometer, and a spectral sensor.

5. The additive manufacturing machine of claim 1, wherein the melt pool monitoring system comprises at least one on-axis sensor.

6. The additive manufacturing machine of claim 1, wherein identifying the outlier clusters comprises:
analyzing the measured emission signals using a clustering analysis method selected from k-means clustering, k-medians clustering, density-based spatial clustering of applications with noise (DBSCAN), and ordering points to identify clustering structure (OPTICS).

7. The additive manufacturing machine of claim 1, wherein the additive manufacturing machine is configured for:
(a) depositing a layer of powder;
(b) selectively fusing a portion of the layer of powder; and
(c) repeating steps (a) and (b) to build a part layer-by-layer, wherein the steps of measuring emission signals, identifying outlier emissions, and identifying outlier clusters are performed with respect to at least two adjacent layers of the part.

8. The additive manufacturing machine of claim 1, wherein the steps of measuring emission signals, identifying outlier emissions, and identifying outlier clusters are performed in real time.

9. The additive manufacturing machine of claim 1, wherein generating the alert comprises:
generating the alert when a cluster magnitude of the identified outlier clusters exceeds a cluster threshold, and wherein the alert is an audio or visual indication provided to an operator of the additive manufacturing machine.

* * * * *